(12) United States Patent
Blazer et al.

(10) Patent No.: US 11,079,563 B2
(45) Date of Patent: Aug. 3, 2021

(54) TWO PIECE ARMORED OPTICAL CABLES

(71) Applicant: Corning Optical Communications LLC, Hickory, NC (US)

(72) Inventors: Bradley Jerome Blazer, Granite Falls, NC (US); David Alan Seddon, Hickory, NC (US); Kenneth Darrell Temple, Jr., Newton, NC (US)

(73) Assignee: CORNING OPTICAL COMMUNICATIONS LLC, Charlotte, NC (US)

( * ) Notice: Subject to any disclaimer, the term of this patent is extended or adjusted under 35 U.S.C. 154(b) by 0 days.

(21) Appl. No.: 16/426,641

(22) Filed: May 30, 2019

(65) Prior Publication Data

US 2019/0278042 A1    Sep. 12, 2019

Related U.S. Application Data

(63) Continuation of application No. PCT/US2017/063569, filed on Nov. 29, 2017.

(60) Provisional application No. 62/428,526, filed on Nov. 30, 2016.

(51) Int. Cl.
G02B 6/44 (2006.01)
(52) U.S. Cl.
CPC ........... G02B 6/4495 (2013.01); G02B 6/443 (2013.01); G02B 6/4411 (2013.01); G02B 6/4432 (2013.01)
(58) Field of Classification Search
CPC ....... H01B 11/1041; H01B 7/221; G02B 6/44
See application file for complete search history.

(56) References Cited

U.S. PATENT DOCUMENTS 3,829,602 A * 8/1974 Ishikawa .................. H01B 7/22
                                                           174/102 R
4,677,418 A * 6/1987 Shulver ................ H01B 7/0063
                                                           174/102 R
4,679,898 A    7/1987 Grooten
(Continued)

FOREIGN PATENT DOCUMENTS

CN    104914524 A    9/2015
GB       2336000 A   10/1999

OTHER PUBLICATIONS

International Search Report and Written Opinion of the International Searching Authority; PCT/US2017/063569; dated Feb. 16, 2018; 13 Pages; European Patent Office.
(Continued)

*Primary Examiner* — Chau N Nguyen
(74) *Attorney, Agent, or Firm* — William D. Doyle

(57) ABSTRACT

An armored cable includes a core and an armor surrounding the core. The armor includes at least one armor access feature formed in the armor to weaken the armor at the access feature. A jacket surrounds the armor and the jacket includes a primary portion of a first extruded polymeric material and at least one discontinuity of a second extruded polymeric material in the primary portion, the discontinuity extending along a length of the cable, and the first material being different from the second material, wherein the bond between the discontinuity and the primary portion allows the jacket to be separated at the discontinuity to provide access to the core, and the at least one armor access feature and the at least one discontinuity are arranged proximate to each other to allow access to the core.

13 Claims, 5 Drawing Sheets

(56) References Cited

U.S. PATENT DOCUMENTS

| | | | | |
|---|---|---|---|---|
| 4,740,658 | A | * | 4/1988 | Hoffman ............. E21B 17/1035 174/102 R |
| 5,778,652 | A | | 7/1998 | Kunze |
| 6,014,487 | A | | 1/2000 | Field et al. |
| 6,459,836 | B1 | * | 10/2002 | Bocanegra ........... G02B 6/4435 174/102 D |
| 6,494,496 | B1 | | 12/2002 | Sweeney |
| 6,665,478 | B1 | | 12/2003 | Shen |
| 6,976,308 | B2 | * | 12/2005 | Jonli ....................... H01R 4/021 29/418 |
| 7,554,038 | B2 | * | 6/2009 | Oga ................... H01B 11/1008 174/102 R |
| 8,649,644 | B2 | | 2/2014 | Greenwood, III et al. |
| 9,201,208 | B2 | | 12/2015 | Gimblet et al. |
| 9,594,226 | B2 | | 3/2017 | Blazer et al. |
| 2002/0159727 | A1 | | 10/2002 | Okada et al. |
| 2008/0080818 | A1 | * | 4/2008 | Cobb, III ............. G02B 6/4475 385/86 |
| 2009/0317039 | A1 | | 12/2009 | Blazer et al. |
| 2009/0317658 | A1 | | 12/2009 | Narita |
| 2011/0297397 | A1 | * | 12/2011 | Morrison ................. H02G 9/06 166/382 |
| 2013/0108226 | A1 | * | 5/2013 | Gimblet ............... G02B 6/4495 385/100 |
| 2015/0043874 | A1 | | 2/2015 | Sandate Aguilar et al. |
| 2015/0110451 | A1 | | 4/2015 | Blazer et al. |

OTHER PUBLICATIONS

English Translation of CN201780083037.7 Office Action dated Mar. 18, 2020; 7 Pages; Chinese Patent Office.

Chinese Patent Application No. 201780083037.7, Notice of Allowance dated Mar. 10, 2021; 4 pages; (English Translation Only); Chinese Patent Office.

* cited by examiner

TWO PIECE ARMORED OPTICAL CABLES

CROSS-REFERENCE TO RELATED APPLICATIONS

This application is a continuation of International Application No. PCT/US17/63569, filed on Nov. 29, 2017, which claims the benefit of priority to U.S. Application No. 62/428,526, filed on Nov. 30, 2016, both applications being incorporated herein by reference.

BACKGROUND

An armored fiber optic cable is disclosed, specifically a fiber optic cable having access features for accessing a core of the fiber optic cable, and an armor layer having armor halves to further enhance core access features of the cable.

BRIEF DESCRIPTION OF THE DRAWINGS

According to common practice, the various features of the drawings discussed below are not necessarily drawn to scale. Dimensions of various elements in the drawings may be expanded or reduced to more clearly illustrate embodiments of the invention.

DETAILED DESCRIPTION

Figure 1:
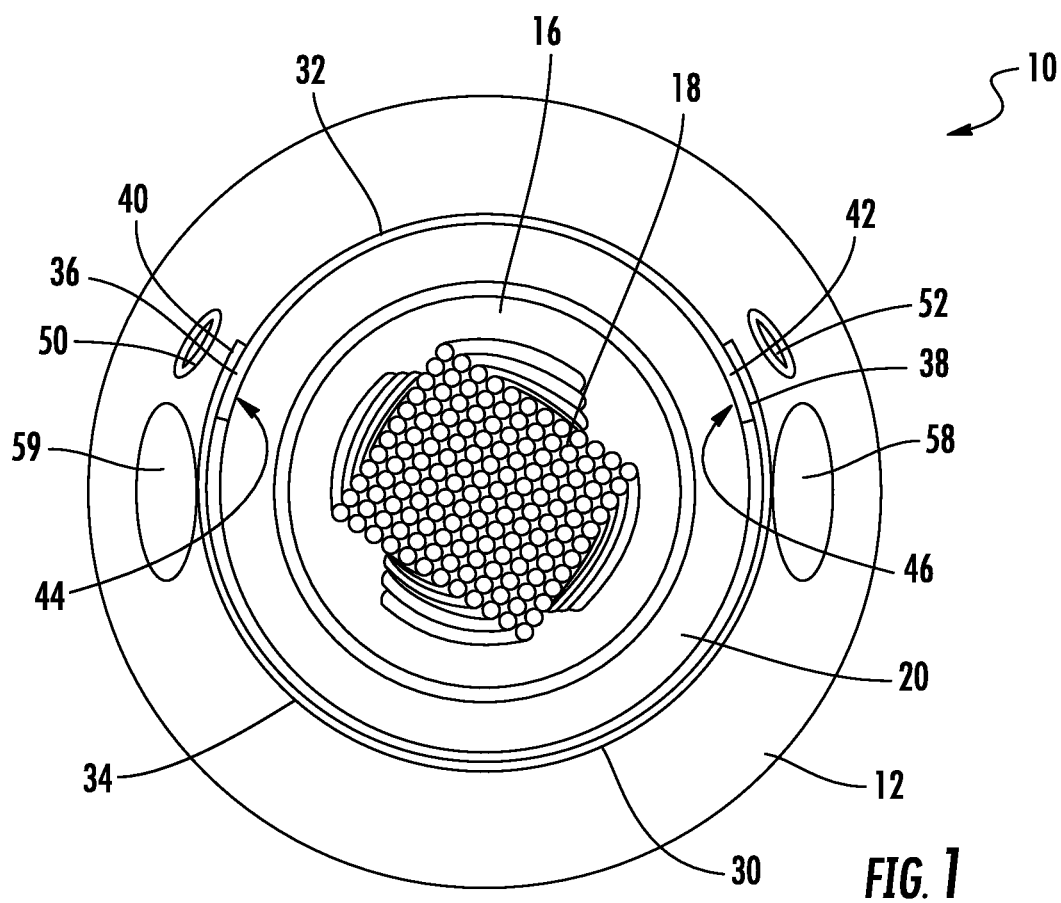
FIG. 1 is a cross-sectional view of a fiber optic cable according to a first embodiment.

Reference is now made in detail to the present preferred embodiments of the disclosure, examples of which are illustrated in the accompanying drawings. Whenever possible, identical or similar reference numerals are used throughout the drawings to refer to identical or similar parts.

Referring generally to the figures, various embodiments of an optical communication cable (e.g., a fiber optic cable, an optical fiber cable, etc.) are shown. In general, the cable embodiments disclosed herein include one or more optical transmission elements wrapped in a protective, reinforcement or armor material (e.g., a corrugated metal sheet of material). A cable body or jacket formed from a polymer material (e.g., a medium density polyethylene material) surrounds the armored group of optical fibers. Generally, the cable jacket provides physical support and protection to the optical fibers within the cable and the armor material provides additional reinforcement to the optical fibers within the cable body.

In various embodiments discussed herein, the reinforcement layer is formed from at least two separate pieces or sheets of material that are each wrapped a portion of the distance around the optical fibers. Because the reinforcement layer is formed from two pieces of material, the opposing lateral edges of each sheet of reinforcement material may be overlapped, coupled to or bonded together to form a reinforcement layer surrounding the optical fibers. In various embodiments, in addition to holding the two segments of the reinforcement layer together around the optical fibers, the coupling between the two segments of the reinforcement layer may also provide for additional circumferential and/or axial rigidity to the cable. In addition, in contrast to single-piece wrapped armor layers typical in fiber optic cables, the individual sections of the multi-piece reinforcement layer discussed herein do not form a complete loop, allowing both inner and outer tooling to be used to more precisely shape the segments of the reinforcement layer to fit snuggly around the optical transmission elements of the cable.

In addition to the formation and strength functions discussed above, the multi-piece reinforcement layer discussed herein works in conjunction with easy access features to provide easy access to optical fibers within the cable, in various embodiments. In such embodiments, the cable jacket may include two or more easy access features (e.g., coextruded discontinuities within the material of the cable jacket) that provide for splitting of the jacket by the user. In various embodiments, the easy access features may be located adjacent to the lateral edges of the segments of the reinforcement layer and the reinforcement layers may be bonded to the cable jacket. In such embodiments, when the cable jacket is opened by splitting along the easy access features, the segments of reinforcement layer may remain bonded to the cable jacket and the separate segments of the reinforcement layer allowed to separate from each other. This arrangement allows for easy access to the optical fibers within the cable with a single opening action.

Figure 2:
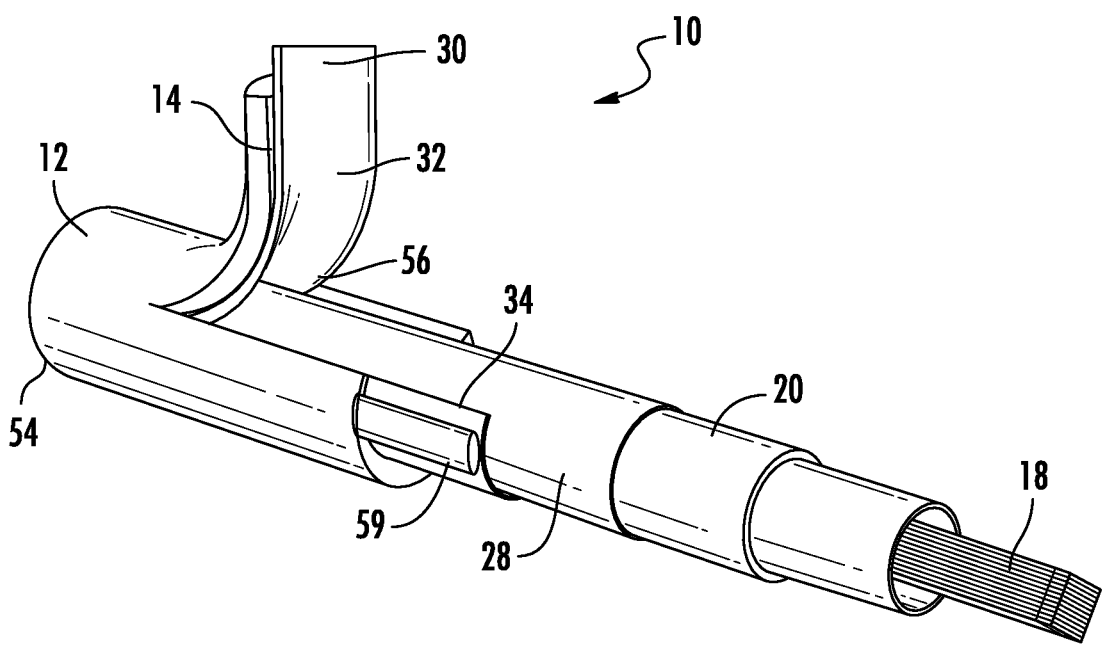
FIG. 2 is a perspective view of the cable illustrated in FIG. 1.

Referring to FIGS. 1 and 2, an optical communication cable, shown as cable 10, is shown according to an exemplary embodiment. Cable 10 includes a cable body, shown as cable jacket 12, having an inner surface 14 that defines an inner passage or cavity, shown as central bore 16. As will be generally understood, inner surface 14 of jacket 12 defines an internal area or region within which the various cable components discussed below are located. Generally, cable 10 provides structure and protection to optical fibers 18 during and after installation (e.g., protection during handling, protection from elements, protection from vermin, etc.).

In the embodiment shown in FIG. 1, cable 10 includes a plurality of core elements located within central bore 16. A first type of core element is an optical transmission core element, and in this embodiment, the optical transmission core elements include optical fibers 18, which may be, for example, 200 μm low loss optical fibers stacked in a 6 fiber ribbon subunit base structure which achieves better fiber density for a given diameter compared to conventional ribbons. In accordance with aspects of the present disclosure, the 6 fiber subunit base structure may be used in 6, 12, 18, 24, 30 and 36 fiber ribbon widths. As shown in FIGS. 1 and 2, core elements may include a buffer tube 20 and a film or membrane, shown as binding film 28, located around buffer tube 20. Thin film 28 may be an extruded thin film that cools to provide an inwardly directed force on to buffer tube 20.

In various embodiments, film 28 is formed from a first material and jacket 12 is formed from a second material. In various embodiments, the first material is different from the second material. In some such embodiments, the material type of the first material is different from the material type of the second material. In various embodiments, film 28 may be formed from a variety of extruded polymer materials. In various embodiments, film 28 may be formed from low-density polyethylene (LDPE), polyester or polypropylene. In one embodiment, film 28 is formed from a linear LDPE. In one embodiment, film 28 is formed from an LDPE material having a modulus of elasticity between 600 MPa and 1000 MPa, and more specifically about 800 MPa (e.g., 800 MPa plus or minus 5 percent). In one embodiment, film 28 is formed from a polyester material having a modulus of elasticity between 2000 MPa and 2800 MPa, and more specifically about 2400 MPa (e.g., 2400 MPa plus or minus 5 percent). In various embodiments, the material of film 28 may include a coloring material. In one such embodiment, film 28 may be colored the same as jacket 12. In one such embodiment, the material of film 28 may be a polymer material (e.g., LDPE, PP) including carbon black coloring material, and the different material of jacket 12 may be a different polymer material (e.g., medium density polyethylene) that also includes carbon black coloring material. In addition, film 28 may include UV stabilizing compounds and may include weakened areas (e.g., lower thickness areas) that facilitate tearing and opening along with other components of cable 10 discussed herein.

As noted above, the material of film 28 is different from the material of jacket 12. In some such embodiments, film 28 is formed from a first material that is extruded at an earlier time or earlier stage in cable production than jacket 12. In such embodiments, film 28 is formed prior to formation of jacket 12. In some such embodiments, a first extrusion process forms film 28 at an earlier time in cable production, and a second extrusion process forms jacket 12 at a later time in cable production. In some such embodiments, the first material of film 28 and the second material of jacket 12 are the same type of material (e.g., both are MDPE, PP, etc.) that are associated with cable 10 at different time points during the production of cable 10. In other embodiments, the first material of film 28 and the second material of jacket 12 are the different types of material (e.g., film 28 is an LDPE and jacket 12 is MDPE) and are also associated with cable 10 at different time points during production of cable 10.

In various embodiments, a layer of powder, such as water absorbing powder or particles, such as super absorbent polymer (SAP), or a water swellable gel or liquid, is located within bore 16. In such embodiments, the inner surface of film 28 may include the water absorbent particles or other material that directly contacts the outer surface of buffer tube 20.

As shown, cable 10 includes a reinforcement sheet or layer, shown as armor layer 30, that is located outside of film 28 in the exemplary arrangement of FIG. 1. Armor layer 30 is wrapped around the interior elements (including optical fibers 18) of cable 10 such that armor layer 30 surrounds optical fibers 18. Armor layer 30 generally provides an additional layer of protection to fibers 18 within cable 10, and may provide resistance against damage (e.g., damage caused by contact or compression during installation, damage from the elements, damage from rodents, etc.).

In an exemplary embodiment, armor layer 30 is located outside of binder film 28. In various embodiments, armor layer 30 is formed from a corrugated sheet of metal material having an alternating series of ridges and troughs. In one embodiment, the corrugated metal is steel. In other embodiments, other non-metallic strengthening materials may be used. For example, armor layer 30 may be formed from fiberglass yarns (e.g., coated fiberglass yarns, rovings, etc.). In some embodiments, armor layer 30 may be formed from plastic materials having a modulus of elasticity over 2 GPa, and more specifically over 2.7 GPa. Such plastic armor layers may be used to resist animal gnawing and may include animal/pest repellant materials (e.g., a bitter material, a pepper material, synthetic tiger urine, etc.). In one embodiment, cable 10 could include a layer of nylon 12 acting to resist termites.

As shown in FIGS. 1 and 2, armor layer 30 includes a first segment 32 and a second segment 34. First segment 32 has a first lateral edge 36 and a second lateral edge 38, and second segment 34 has first lateral edge 40 and a second lateral edge 42. In the embodiment shown, lateral edges 36, 38, 40 and 42 are substantially parallel to the longitudinal axis of cable 10. In various embodiments discussed herein, lateral edge 36 of first segment 32 is positioned adjacent to lateral edge 40 of second segment 34, and lateral edge 38 of first segment 32 is positioned adjacent to lateral edge 42 of second segment 34 such that combined first segment 32 and second segment 34 form a reinforcement layer that surrounds the plurality of core elements. While the embodiments discussed herein relate primarily to cables including two-piece reinforcement layers, in other embodiments, armor layer 30 can be multi-piece armor layers that include three, four, five or more segments with peripheral edges and overlaps as discussed herein.

In the embodiment of FIGS. 1 and 2, first segment 32 and second segment 34 of armor layer 30 are wrapped around the core elements such that lateral edge 36 of first segment 32 passes over or overlaps lateral edge 40 of second segment 34 creating a first overlap portion 44 and that lateral edge 38 of first segment 32 passes over or overlaps lateral edge 42 of second segment 34 creating a second overlap portion 46. Overlap portion 46 may be spaced more or less than 180 degrees from overlap portion 44. The overlap portions may overlap 2.5-3.0 mm, or more preferably the overlap dimension may be between 0.5-1.5 mm.

In various embodiments, the sections of armor segments 32 and 34 within overlap portions 44 and 46 may be coupled together to help maintain multi-piece armor layer 30 in the wrapped arrangement shown in FIGS. 1 and 2. In one embodiment, a bonding agent or adhesive may be located between opposing surfaces within overlap portions 44 and 46 to bind armor segments 32 and 34 together. In other embodiments, one or more mechanical coupling arrangements, such as welding, either continuous or intermittently, may be used to couple armor segment 32 to armor segment 34.

Two overlaps instead of one as is typical in conventional armored cables may significantly reduce one of the causes of jacket zippering. During a twist action on a single armor cable, the outer overlap travels in one axial direction, and the inner overlap or 'underlap' travels in the other axial direction, causing an elongation of the bonded polyethylene jacket that is beyond the elongation limit. For two overlaps, the total included axial distance will be at least half. Moreover, with precision placement of overlaps, aspects of the present disclosure include providing for a bond-free zone at the jacket/overlap edge/underlap back-edge intersection. With precision angular placement in the extrusion crosshead, a glue bead or other suitable material may be coextruded for special jacket slip properties at the overlap edge areas.

Two-piece armor may offer an advantage in cycle flex. For example, the neutral axis of each half, during cable bending, may now be radially away from the center of the cable. This would facilitate a smaller inner radius to outer radius (r/R) strain in the armor, allowing for no corrugations in the armor layer 30 for larger diameter cables. Today with conventional one-overlap armor, up to a 5 mm core the armor does not have to be corrugated, and the cable will still pass GR-20 cycle flex (no armor cracks after 25 cycles at prescribed bend radius mandrel). With two-piece armor, the core diameter may be up to 8, or up to 10 mm or larger before corrugations are required. Eliminating corrugations allows for a thinner armor layer (0.17 mm flat instead of 0.70 mm corrugated thickness). This facilitates smaller diameter, lower weight armored cables, and significant cost reduction in armor and jacket material (e.g., polyethylene) usage and cost. Corrugated armor may be 106% of the cable length, while un-corrugated armor uses less steel per cable length, or 100% of cable length.

The armor segments 32 and 34 may be formed with steel rollers so that the finished armor form fits with nearly complete circumferential contact with the core or tube. The extruded and cooling jacket in the water trough will further radially compress the two armor segments onto the core elements or tube 20. The armor segments 32 and 34 thus apply radial pressure to buffer tube 20 and will facilitate effective coupling which will keep the tube 20 from shrinking back in the jacket 12 when cables are lashed aerially, after seasonal temperature cycling.

In conventional armored cables, the armor inside diameter is difficult to form fit tight to the core elements. The tube to armor clearance or TAC is variable and changes across fiber count range, across jacket lines, and between setups. The two piece armor enables the tight form fit, thus enabling the cable to act more like a composite structure during crush, bend, twist, impact, etc. This tight construction enables thinner tube and jacket walls while maintaining the same relative overall cable strength.

Cable jacket 12 may include a plurality of embedded elongate members, shown as access features 50 and 52. In general, access features 50 and 52 are elongate members or structures embedded within the material of cable jacket 12. In various embodiments, access features 50 and 52 are contiguous members that extend the length of cable jacket 12 between the first and second ends of the cable.

In general, cable jacket 12 is made from a first material, and access features 50 and 52 are made from a second material that is different from the first material. The difference in materials provides a discontinuity or weakness within cable jacket 12 at the location of access features 50 and 52. These discontinuities provide an access point that allows a user of cable 10 to split cable jacket 12 when access to optical fibers 18 is desired. In various embodiments, access features 50 and 52 may be formed from a material (e.g., a polypropylene/polyethylene blend) with low bonding relative to the material of cable jacket 12 (e.g., a medium density polyethylene) that allows for jacket splitting by the user. In various embodiments, access features 50 and 52 may be formed (e.g., coextruded) as described below. In other embodiments, access features 50 and 52 are non-extruded elements, such as rip cords, that are embedded in the material of cable jacket 12.

In the exemplary embodiment, the access features 50, 52 are bonded to the main portion of the jacket when the jacket 12 is extruded. The main portion and the access features 50, 52 can be formed from extrudable polymers, so that as the extrudate used to form the main portion of the jacket 12 and the access features 50, 52 cools and solidifies, the extrudates become bonded at an interface of the access features 50, 52. When the access features 50, 52 are formed while extruding in the same step as the main portion of the jacket 12, the bond between access features 50, 52 and the remainder of the jacket 12 can be generally described as enabled by polymer chain entanglement as the jacket 12 solidifies. The jacket 12 accordingly comprises a cohesive composite structure. The interfaces may be a transition region between the materials of the main portion of the jacket 12 and the access features 50, 52.

The access features 50, 52 can be relatively narrow strips in the jacket 12, and may occupy relatively small portions of the jacket cross-sectional area AJ. In FIGS. 1 and 2, two access features 50, 52 are formed in the jacket 12 to facilitate opening of the jacket as shown in FIG. 2. However, the number, spacing, shape, composition and other aspects of the access features 50, 52 can be varied. For example, a single access feature in the jacket 12 may be sufficient to allow the cable jacket 12 to be opened away from the core. The access features in FIG. 1 are shown as ovular strips for the purposes of illustration. In practice, the access features may have curved or irregular shapes, and the access features will generally fracture so that they remain attached to the main portion of the jacket.

The materials and processes used to form the main portion of the jacket 12 and the access features 50, 52 can be selected so that the interfaces allow for relatively easy access to the central bore 16 by tearing the jacket 12 as shown in FIG. 2. The cable 10 may be constructed to meet other requirements for robustness, such as requirements for the jacket 12 stay intact under tensile loads, twisting, in temperature variations, and when subjected to other known cable test criteria, such as, for example, ICEA 460, and GR20.

In accordance with aspects of the disclosure, the main portion of the jacket 12 may be extruded from medium density polyethylene (MDPE), and the access features 50, 52 may be extruded from polypropylene (PP). The jacket 12 may be formed in a coextrusion process so that the main portion of the jacket 12 and the access features 50, 52 bond during cooling to form relatively strong bonds at the interfaces.

As shown in FIGS. 1 and 2, access features 50 and 52 may be positioned within cable jacket to be proximate with and radially exterior to overlap sections 44 and 46, respectively. As shown in FIG. 2, when cable jacket 12 is opened, splits 54 and 56 are formed along the length of cable jacket 12 generally at the position of access features 50 and 52, respectively. With access features aligned with overlap sections 44 and 46, when cable jacket 12 is opened, armor layer 30 may also be opened by separating armor segment 32 from armor section 34 at the same time or with the same opening action that opens cable jacket 12. Thus, in certain embodiments, when cable jacket 12 is opened, armor layer 30 is also opened providing efficient access to the elements of core 26. During manufacture, the two armor segments 32 and 34 traveling into the jacketing extruder will facilitate precise control of the angular position of the overlaps 44 and 46 with respect to the fast access coextruded features 50 and 52.

Figure 9:
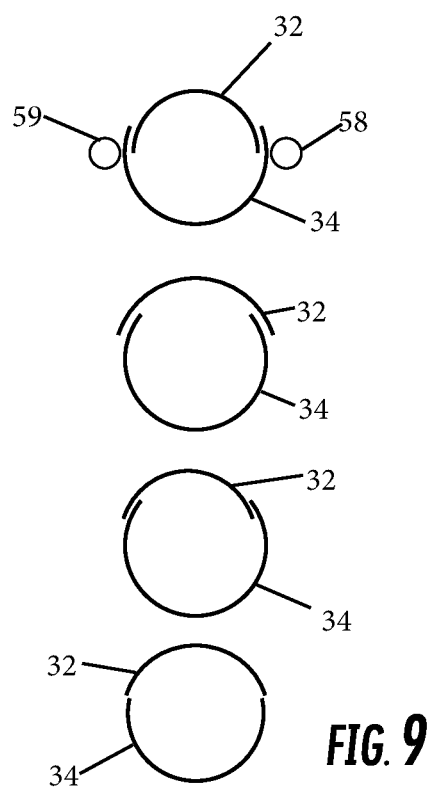
FIG. 9 illustrates various configurations for armor halves in accordance with aspects of the present disclosure.

The overlaps may be formed in a variety of ways. For example, the strength members may be placed adjacent to the overlap so that there is only one armor steel thickness between wire and tube, facilitating smaller outside diameter cable. The strength member, which may be a steel wire for example, may be spot welded to one segment of armor, while the other strength member may be spot welded to the other segment of armor. This may provide extra cable strength to oppose unintended fast access jacket opening, or for twist resistance, or for other physical strength features. As shown in FIG. 9, for example, the overlaps may be formed so that one halves' overlaps are both on the outside, or both on the inside, or one overlap is on the outside and one inside. In accordance with yet other aspects of the present disclosure, the armor segment halves may be butted, with no overlap at all (one side or both). The two armor halves may be symmetrical, or asymmetrical. The angle of the armors could be symmetrical (both at 180° plus the overlap distance), or one armor segment could be less than, or significantly less than 180°, where the smaller armor could act like a 'lid' or 'top' of the container that can be taken off. The strength members may be adjacent, on top of, or up to 90° away from the overlaps.

Figure 10:
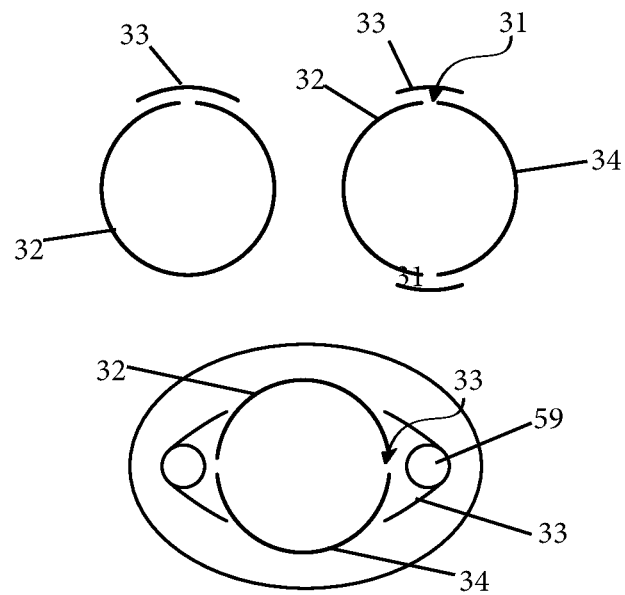
FIG. 10 illustrates various configurations of butt splices for armor halves in accordance with aspects of the present disclosure.

As shown in FIG. 10, a butt splice 31 of the two armor halves 32, 34 may be provided with a cover piece 33. The cover piece in turn may act as a ripcord for easy access to the core of the cable. In addition, a butt splice may be formed under the strength members 58 and 59, respectively, or abutting the strength members and formed with a high-strength polymer to bond and reinforce the seam.

In some embodiments, a bonding agent (e.g., Maleic anhydride, ethylene acrylic acid copolymer, etc.) may be used in or adjoining cable jacket 12 to increase bonding between the inner surface of cable jacket 12 and the outer surface of armor layer 30. The bonding between cable jacket 12 and armor layer 30 may facilitate opening of both layers together with a single opening action. Specifically, as cable jacket 12 is opened, armor layer 30 may remain bound to cable jacket 12 causing armor segment 32 to separate from armor segment 34 along overlap sections 44 and 46. The bonding agent may also act to prevent relative sliding of edges of two-piece armor layer 30, and the bonding agent may also be used to prevent relative sliding of the components of any of the other embodiments disclosed herein.

In one embodiment, the outer surfaces of armor layer 30 may include a material or coating (e.g., a thermoplastic exterior coating) that, when heated, bonds to the thermoplastic of cable jacket 12. In one such embodiment, the exterior coating of armor layer 30 is melted by the heat of the material of cable jacket 12 as the jacket is extruded over armor layer 30 and the subsequent cooling bonds together the materials of cable jacket 12 and the exterior coating of armor layer 30. In another embodiment, an induction heater is used to heat armor layer 30, causing the exterior coating of armor layer 30 to melt and bond to the inner surface of cable jacket 12. In one embodiment, the exterior coating of armor layer 30 is an ethylene acrylic acid copolymer (EAAC).

As discussed above, cable 10 includes a binder film 28 located between the elements of core 16 and armor layer 30. In some embodiments, the outer surface of binder film 28 is bonded to the inner surface of armor layer 30 (e.g., with glue, bonding agent, etc.) so that when cable jacket 12 is opened utilizing access features 50 and 52, binder film 28 remains bound to armor layer 30 and armor layer 30 remains bound to cable jacket 12. Thus, a single opening action splitting cable jacket 12 along access features 50 and 52 acts to open armor layer 30 and binder film 28. In one embodiment, an induction heater is used to heat armor layer 30 causing the material of film 28 to melt and bond to the inner surface of armor layer 30. In one such embodiment, air may be injected into the center of film 28, pushing film 28 outward to engage the inner surface of armor layer 30 during heating to increase bonding between film 28 and armor layer 30.

Figure 11:
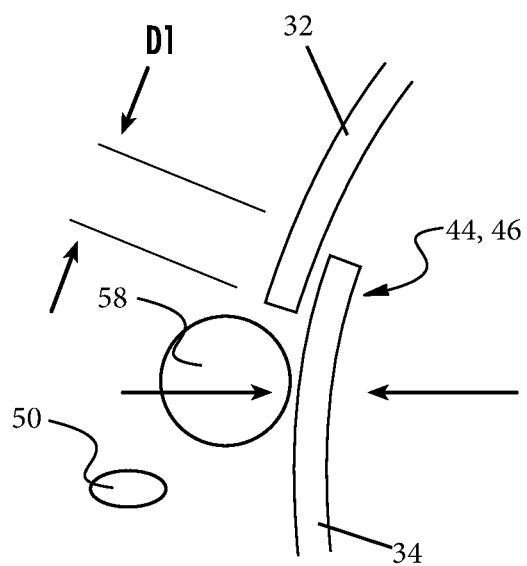
FIG. 11 illustrates various configurations for armor overlaps with respect to strength members and fast access features, in accordance with aspects of the present disclosure.

Referring back to FIGS. 1 and 2, strength members 58 and 59 may be provided at diametrically positions embedded in and running longitudinally within the jacket 12. Strength members 58 and 59 may define a neutral axis of the cable 10 perpendicular to the longitudinal axis. The strength members 58 and 59 may be steel wires and may be flattened on the jacket line so that the cable jacket thickness may be minimized for material cost reduction. As shown in FIG. 11, the position of the fast access features 50 and 52 with respect to the strength members 58 and 59 and the overlaps 44 and 46 may be fixed or varied to enable additional features, like fast access feature robustness during extreme cable mechanical duress. For example, placing the fast access feature on the other side of strength member, the jacket wrap around the strength member may act like a 'key' that strengthens or buffers the fast access feature from the zippering action of the twisted cable overlap. The jacket extending around the strength member may also be an extra notch for efficient opening access by a field technician.

Figure 3:
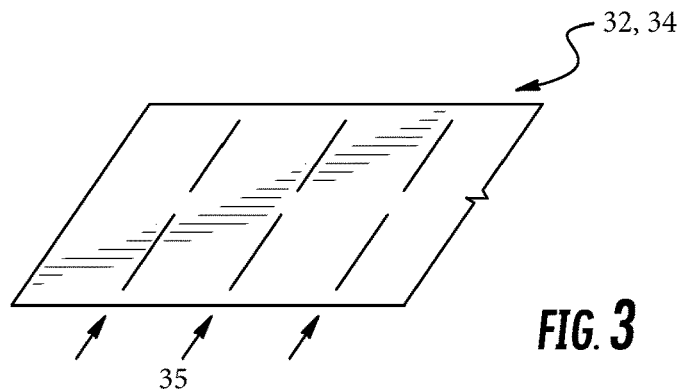
FIG. 3 is an isolated partial view of an armor piece in accordance with aspects of the present disclosure.

In accordance with aspects of the present disclosure, as shown in FIG. 3, the armor segments 32 and 34 may be formed from one piece of steel. If the armor is to be corrugated, the armor piece may be partially scored and run through the corrugator. An armor separator device may be provided after the corrugator, or act of corrugation itself, completes the armor separation into two pieces. If the armor is going to be non-corrugated, the scored and separated armor travels to two sets (one half each) of forming rollers.

In accordance with yet other aspects of the present disclosure, the armor segments 32 and 34 may be sheared. Chord-shear is a repeating sheared shape 35 that after the steel is formed into a cylinder and a cross section is taken, it appears as if a saw has cut partially through the cylinder, creating a 'chord' on the cross-sectional circle. As shown in FIG. 3, a shear device may regularly shear armor in middle of the armor width, repeating at a fixed axial distance. If sheared and formed into a cylinder, during cycle flex, cracks in the armor are allowed to buckle in compression and stretch apart in tension, but new cracks and crack propagation does not occur. For example, when core diameter becomes larger, (15+mm), non-corrugated armor with chord shear may provide the ability to use non-corrugated armor for all cable diameters.

Cycle flex of finished cable will contract and lengthen the open sections; therefore no new armor cracks will form. As the chord-shear armor is stretched before extrusion, the armor will form expanded metal sections at the sheared sections which will foster melting or sticking of the jacket directly to the thin film binder 28 or directly to the PE tube 20 through the expanded sections. During the fast access process described herein for accessing the core of the cable, the expanded metal sections will provide a feel and sound during stripping. Hot Formed steel may offer higher elongation-to-break levels that fosters more stretch, up to 60% elongation as compared to regular cold rolled steel armor at 5% elongation to break.

Figure 4:
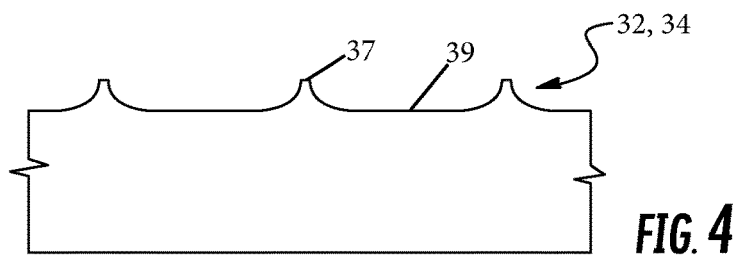
FIG. 4 is a cutaway sectional view of a portion of an armor piece with chord-shear shapes in accordance with aspects of the present disclosure.

As shown in FIG. 4, the chord-sheared edges 37 may stand up from the armor surface 39 or may be formed to stand up. In this manner, the chord-sheared edges 37 may partially embed into the jacket during the extrusion process which, for example, may cause squirrel/rodent irritation before full jacket is removed. In accordance with other aspects of the present disclosure, shear-edges on one side may be pressed up, with shear-edges on the opposite side pressed down, so that during cycle flex, the two edges do not interfere and on the compressive side of the cable bend, allowing chord-shear armor to work without having to be stretched.

Figure 5:
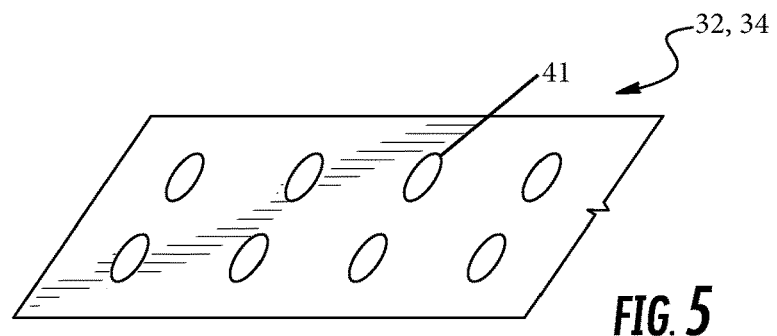
FIG. 5 is an illustration of a punched teardrop feature of an armor piece in accordance with aspects of the present disclosure.
Figure 6:
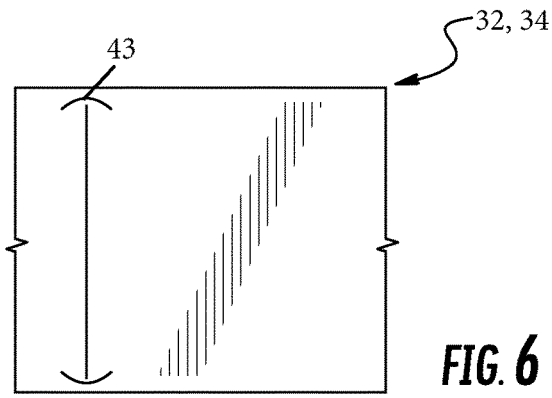
FIG. 6 is an illustration of a punched curve feature of an armor piece in accordance with aspects of the present disclosure.

As shown in FIG. 5, round or tear-drop shaped sections 41, for example, may be punched out of the armor, so that the armor does not have to be stretched or expanded to open up the sheared/punched armor sections. As shown in FIG. 6, the shear shape may include curved edges 43 at or toward the ends to stop crack propagation.

Figure 7A:
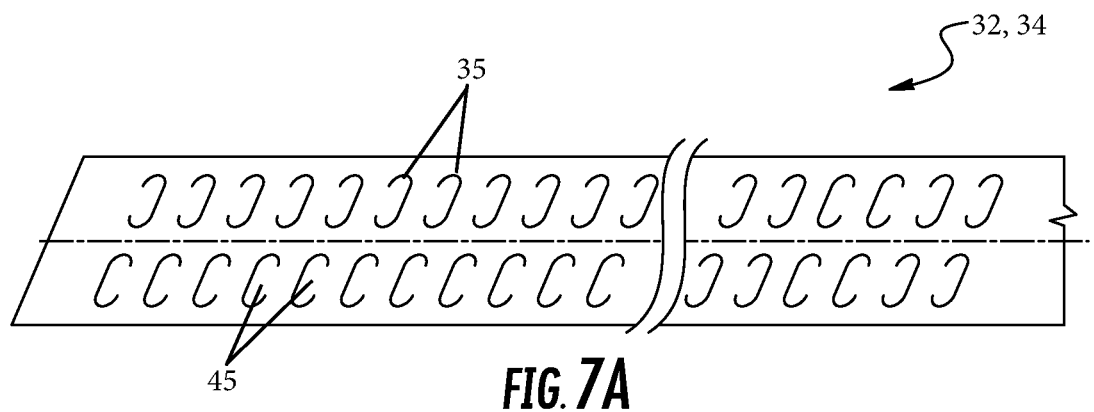
FIGS. 7A and 7B illustrate a metal armor piece with shear cuts having curved edges and formed as tabs in accordance with aspects of the present disclosure.
Figure 7B:
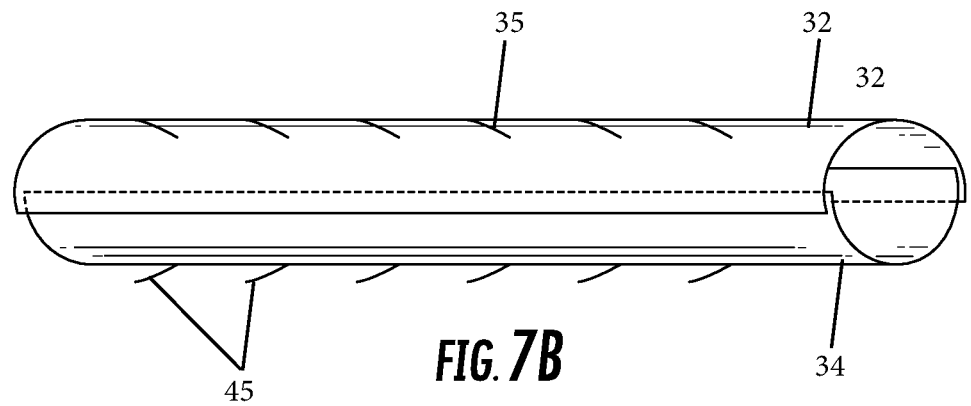
Figure 8:
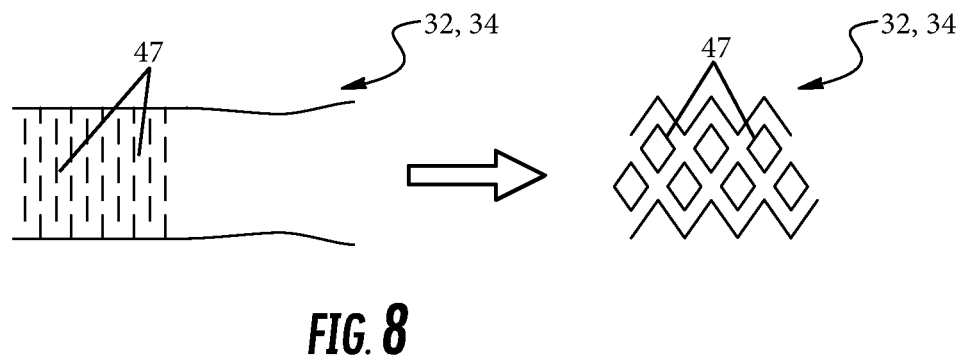
FIG. 8 illustrates a metal armor piece with shear cuts stretched to form open sections in accordance with aspects of the present disclosure.

As shown in FIGS. 7A and 7B, the shear shape 35 may be adjusted to have round ends to prevent crack propagation, but also be a partial shear to not remove any material. In essence, tabs 45 may be created that can be pressed toward the core or into the jacket. The embodiment shown in FIGS. 7A and 7B illustrates the tabs helping to lock the core or tube to the jacket to enable a 'laminated PE/steel/PE' structure. Many different chord-shear patterns may be used with the two-piece armor. For example, there could be three tabs, then one open punched area, then three more tabs—to get both locking and actual sticking together of the jacket material and the binder or tube materials. FIG. 8 is an example illustrating a set of staggered shear cuts 47 made in the metal that expand when the metal armor is stretched under tension prior to being formed around the core of the cable.

In general, the separation properties disclosed in this specification may be obtained by coextruding the discontinuities from a different material than the material used to form the primary portion of the jacket. As an alternative method, the discontinuities may be made from the same material as the remainder of the jacket, but subjected to different curing conditions, for example.

What is claimed is:

1. A cable, comprising:
   a core comprising an optical transmission core element;
   a first armor component surrounding a first portion of the core, the first armor component comprising a first armor outer surface and a first armor inner surface;
   a second armor component surrounding a second portion of the core, the second armor component comprising a second armor outer surface and a second armor inner surface;
   a plurality of overlap portions each extending in a longitudinal direction along the core, wherein each overlap portion comprises a longitudinal edge portion of the first armor inner surface abutting a longitudinal edge portion of the second armor outer surface; and
   a jacket surrounding the core, the first armor component, and the second armor component;
   wherein each longitudinal edge portion of the first armor inner surface is bonded to each longitudinal edge portion of the second armor outer surface, forming a first bonded region and a second bonded region;
   wherein each overlap portion has an overlap dimension of between 0.5 mm to 1.5 mm;
   wherein at least one of the first armor component and the second armor component comprises a chord-shear; and
   wherein the jacket further comprises an access feature, the access feature comprising:
      a primary portion of a first extruded polymeric material; and
      at least one discontinuity of a second extruded polymeric material in the primary portion, the discontinuity extending along a longitudinal length of the cable, wherein a bond between the discontinuity and the primary portion allows the jacket to be separated at the discontinuity.

2. The cable of claim 1, wherein at least one of the first bonded region and the second bonded region is bonded via a weld.

3. The cable of claim 1, wherein the discontinuity is provided at a predetermined angular position along a circumference of the jacket to provide precise alignment of the access feature with at least one of the overlap portions.

4. The cable of claim 1, further comprising a plurality of strength members, at least two of the strength members defining a neutral axis perpendicular to a longitudinal axis of the cable, wherein the plurality of overlap portions substantially align with the strength members along the neutral axis.

5. The cable of claim 4, wherein the strength members are diametrically opposed.

6. The cable of claim 1, wherein an arc length of the first armor outer surface is greater than an arc length of the second armor outer surface when the cable is viewed in cross-section.

7. The cable of claim 1, wherein the first armor component and the second armor component define a core diameter.

8. The cable of claim 7, wherein the first armor component and the second armor component are non-corrugated and define a core diameter of 10 mm or less.

9. The cable of claim 7, wherein the first armor component and the second armor component have a flat thickness of approximately 0.17 mm.

10. The cable of claim 7, further comprising a buffer tube having an outer buffer tube diameter, wherein the outer buffer tube diameter is substantially equal to the core diameter such that a gap between the buffer tube and the first armor component and the second armor component is minimized.

11. The cable of claim 1, wherein the chord-shear defines a plurality of shear shapes.

12. The cable of claim 11, wherein the shear shapes are a plurality of transverse slits through the armor.

13. A cable, comprising:
   a core comprising an optical transmission core element;
   a first armor component surrounding a first portion of the core, the first armor component comprising a first armor outer surface and a first armor inner surface;
   a second armor component surrounding a second portion of the core, the second armor component comprising a second armor outer surface and a second armor inner surface;
   a plurality of overlap portions, wherein each overlap portion comprises a longitudinal edge portion of the first armor inner surface abutting a longitudinal edge portion of the second armor outer surface; and
   a jacket surrounding the core, the first armor component, and the second armor component;
   wherein each longitudinal edge portion of the first armor inner surface is bonded to each longitudinal edge portion of the second armor outer surface, forming a first bonded region and a second bonded region;

wherein at least one of the first armor component and the second armor component comprises a chord-shear; and
wherein the optical transmission core element comprises a stacked optical fiber ribbons, wherein the core further comprises:
a buffer tube surrounding the stacked optical fiber ribbons;
wherein the first and second armor components surround the buffer tube within the jacket;
wherein the first armor component and the second armor component are curved defining a core diameter of 10 mm or less.

* * * * *